United States Patent [19]

Daimon et al.

[11] 4,077,938
[45] Mar. 7, 1978

[54] SOL OF ULTRA-FINE PARTICLES OF LAYERED STRUCTURE MATERIAL

[75] Inventors: Nobutoshi Daimon, Nagano; Toichiro Izawa, Matsudo, both of Japan; Motoyuki Imai, 7-7-905, Hiroo 1-chome, Shibuya, Tokyo, Japan

[73] Assignee: Motoyuki Imai, Tokyo, Japan

[21] Appl. No.: 658,013

[22] Filed: Feb. 13, 1976

[51] Int. Cl.² .............................................. C08L 83/04
[52] U.S. Cl. ................................ 260/37 SB; 252/28; 252/308; 260/37 EP; 260/37 N; 260/38; 260/39 P; 260/40 R
[58] Field of Search ............ 260/37 EP, 37 N, 37 SB, 260/40, 38; 106/291; 252/308, 28

[56] References Cited

U.S. PATENT DOCUMENTS

| | | | |
|---|---|---|---|
| 3,294,683 | 12/1966 | Stansfield et al. | 252/28 |
| 3,356,611 | 12/1967 | Walker et al. | 252/28 |
| 3,855,147 | 12/1974 | Granquist | 252/28 |
| 3,925,214 | 12/1975 | Livingston et al. | 252/28 |

Primary Examiner—Lewis T. Jacobs
Attorney, Agent, or Firm—Wenderoth, Lind & Ponack

[57] ABSTRACT

This invention relates to a sol of ultra-fine particles of layered structure material selected from a group of montmorillonite, hectorite, tetra-silicic mica and taeniolite, characterized in that said layered structure material is hydrophobed by treatment with organic material selected from a group of titanic acid ester; zirconic acid ester; silanes having one of methoxy-, ethoxy- and silanol-radicals and one of vinyl-, epoxy-, acryl- and aminoradicals; β-diketones mixed with lauryl amine; titanium amide; zirconium amide; and cationized silicone oil.

3 Claims, No Drawings

SOL OF ULTRA-FINE PARTICLES OF LAYERED STRUCTURE MATERIAL

DETAILED EXPLANATION OF THE INVENTION

This invention relates to a sol of ultra-fine particles of layered structure material which is hydrophobed by treatment with organic material, and further relates to a heat-resistant, water-resistant and electrical insulating article prepared from the sol.

A layered structure material of silicate such as naturally occurring montmorillonite, synthetic hectorite, synthetic tetra-silicic mica and synthetic taeniolite has a unique property in that it is swollen and cloven into ultra-fine particles by hydration to form a stable sol. In the state of ultra-fine particles, these layered structure materials are remarkebly chemically active. This activity is due to the inherent property of ultra-fine particles cloven to a size close to the molecular size, and to the electro-chemical property of ultra-fine particle crystals.

The crystal structure of the above layered structure minerals generally has a three-layered lattice as a unit, which comprises two $SiO_4$ tetrahedron layers disposed at the upper and lower parts of the lattice and one octahedron layer composed of six anoins 4(O)2(OH) or 4(O)2(F) disposed between the two tetrahedron layers.

Phrophyllite has a structure wherein two thirds of openings in the octahedron layer of the three-layered lattice is occupied by Al and is electrically equilibrated.

In the pyrophyllite structure, when a part of Al of the octahedron layer is replaced by Mg and a part of Si of the $SiO_4$ tetrahedron layer is replaced by Al, negative electrical charges in the three-layered lattice become free. Natural occurring montmorillonite, $W_{1/3}(X,Y)(Si_4O_{10})(OH)_2$ (W = Na; X = Fe, Al, Mn; Y = Mg) has a crystal structure wherein $Ca^{++}$ or $Na^+$ is entered and co-ordinated between adjacent layers of the three-layered lattice to electrically neutralize the negative electrical charges formed as described above.

Tetra-silicic mica may be artificially synthesized by replacing OH of crystal water with F, and is expressed by the formula, for example, $NaMg_{2\frac{1}{2}}(Si_4O_{10})F_2$ or $Ca_{\frac{1}{2}}Mg_{2\frac{1}{2}}(Si_4O_{10})F_2$ (2.5-octahedron type) wherein all of Al of the octahedron layer are replaced with Mg.

Taeniolite is expressed by the formula, for example, $NaMg_2Li(Si_4O_{10})F_2$ or $Ca_{\frac{1}{2}}Mg_2Li(Si_4O_{10})F_2$ or $LiMg_2Li(Si_4O_{10})F_2$ (3-octahedron type) wherein all of Al of the octahedron layer are replaced with Mg and Li.

Synthetic montmorillonite is similarly prepared by replacing OH of crystal water with F, and is expressed by the formula, $NaMg_{2-2/3}Li_{1/3}(Si_4O_{10})F_2$.

Hectorite is expressed by the formula, $Na_{1/3}Mg_{2-2/3}Li_{1/3}(Si_4O_{10})F_2$ or $Li_{1/3}Mg_{2-2/3}Li_{1/3}(Si_4O_{10})F_2$.

These layered structure materials are all classified as a three-layered structure mineral. In addition, they all have common properties in that the bond between layers is weak and that alkali ions co-ordinated between the layers are very hydratable. Due to these properties, these layered structure materials are easily swollen and cloven to ultra-fine particles by introducing a large amount of hydration water between layers. Thus, a sol of the ultra-fine particles is formed. This tendency is strong according to the following order; synthetic taeniolite < synthetic tetra-silicic mica < natural occurring montmorillonite < synthetic hectorite. The bond of layered structure material is strong parallel direction to the layer, but the bond above and below, i.e., between the layers is very weak. Accordingly, the shape of the cloven ultra-fine particle is flake-like. The cloven ultra-fine particle has a size close to the molecular size, i.e., a thickness of 10 – 50 A and a particle diameter (disk diameter) of 100 to 1,000 times as large as the thickness. The ultra-fine particles in the state of sol have an extremely large surface area, i.e., about 100 $m^2/g$. Consequently, the ultra-fine particle in the state of sol has a very high chemical activity synergically accelerated by the electro-chemical property of crystals of the ultra-fine particles.

The ultra-fine particle has negative electrical charges on its surface, and consequently these particles in water are charged with negative electricity. Due to the electrical repulsion among the particles, they are uniformly dispersed in a solvent to form a stable sol.

The ultra-fine particles of these layered structure materials can be formed into an article having an excellent electric insulation property by treating alkaline ions of the particles. The article thus formed also has an excellent heat-resistance since it is made from inorganic material. The notable feature of the particles of these layered structures is that the particles are bonded to each other without using any binder by the action of Van der Waals molecular cohesion force by evaporating and drying the sol, thereby forming a film which is very flexible and has a high tensile strength. Thus, the sol of the ultra-fine particles of these layered structure materials can be used to prepare film, cloth and other sheet-like materials having excellent heat-resistance and electrical insulation properties. However, the article prepared in accordance with the conventional technique has disadvantages in that there remains a porosity of 10 – 15% and that the tear strength is low. Moreover, it has disadvantages in being hygroscopic and absorbing water.

According to the present invention, these undesired properties, particularly re-hydration, were removed. Water is bonded as a polar water molecule with negative electrical charges of oxygen in a crystal structure of a layered structure material in the style of hydrogen bond, and forms a water molecule layer. Since oxygen molecules on the surface of the layered structure material are oriented in the form of hexagonal reticulated plane, water molecules are also oriented just above or below the oxygen molecules in the form of hexagonal reticulated layers in parallel. This water is generally referred to as "water between layers" or "rigid water molecule layer."

This water molecule layer forms a further amount of water molecule layer on its outside depending on the bond strength between layers and hydratable energy. Ions between layers form more water molecule layers in proportion to the order, Ca < Na < Li. The weaker the bond strength between layers is, the more water molecule layers are formed. That is, the amount of water molecule layers increases in proportion to the order, synthetic taeniolite < synthetic tetra-silicic mica < natural occurring montmorillonite < synthetic hectorite.

Sol (or gel) of the above mentioned layered structure material is a very hydrophilic colloid since the layered structure material has a very high reactivity and the colloid is formed by the reaction of the layered structure material with water. An electric property of a product obtained by the sol of the layered structure material becomes poor due to the hydrophilic property. In order to overcome this disadvantage, the water molecule layers should be removed from the layered structure material for industrial use.

For this purpose, ions having high hydratable energy, for example Li, Na, Ca and the like should be removed from ions between the layers. The removal of the ions between layers can be done by chemical treatment with the addition of an electrolyte or by electrical treatment of hydrolysis. By these techniques, the above mentioned hydratable ions between the layers are ion-exchanged with cations such as $K^+$, $NH_4^+$, $Pb^{2+}$, $Zn^{2+}$, $Sn^{2+}$, $Ba^{2+}$, $Sr^{2+}$, $Al^{3+}$, $Sb^{2+}$, $Bi^{2+}$ and the like. However, even after ion-exchanging, mono-hydrate water still remains.

An object of this invention is to provide a sol of layered structure material which has been subjected to a hydrophobing treatment, which can be used to prepare various molded articles having excellent heat-resistant, water-resistant and electrical insulating properties.

Another object of this invention is to provide a molded product prepared by combining the sol of this invention with an organic material, which has improved heat-resistant, water-resistant and electrical insulating properties as well as physical strength.

The bonding mechanism of the layered structure material with organic material according to this invention is quite different from the conventional bonding mechanism of aggregate with a binding agent. That is, the bonding in accordance with this invention is supported by chamical reaction, while the bonding in accordance with conventional technique is made by a simple mixing system.

Heretofore, it was known to react layered structure materials such as naturally occurring montmorillonite or hydrated halloysite with organic materials such as glycols or amines. However, the organic materials used in the conventional technique were all hydrophilic and polar. Consequently, a product prepared using the conventional sol was easily re-hydrated and is not suitable for practical use.

Reactions between layered structure materials and organic treating agents are classified into two types of reactions, that is, "solvation reaction" and "base-exchange reaction."

The "solvation reaction" is carried out by reacting hydrogen of an alkali radical of an organic treating agent with a negative-charged oxygen co-ordinated between layers of the layered structure material having alkali ions between the layers ion-exchanged with other cations. Thus, the alkali radical of organic treating agent is introduced between upper and lower layer lattices of the layered structure material and is regularly co-ordinated between them. The above reaction takes place due to the fact that the bond between the negative-charged oxygen layer and the layer of the layered structure material is weak. The negative-charged oxygen layer is positioned on both upper and lower sides of the layer of the layered structure material. An organic treating agent is used in compounds having a high dielectric constant, the molecule of which can be wholly introduced between layers. Among them, compounds which are polar or have a hydrogen bond can easily be introduced between layers.

Organic treating agents used in the solvation reaction in accordance with this invention include titanic acid ester; zirconic acid ester; silanes having one of methoxy-, ethoxy- and silanol-radicals and one of vinyl-, epoxy-, arcyl- and amino-radicals; and $\beta$-diketones mixed with lauryl amine. These treating agents are introduced between layers of layered structure material in which ions between the layers were ion-exchanged with cations, and form coordinate bonds. In this manner, a sol of layered structure material is hydrophobed, and a dry product prepared therefrom provides excellent heat-resistance and electric insulating properties.

In the present invention, titanic acid ester or zirconic acid ester is hydrolyzed in water to form very fine particles of $TiO_2$ or $ZrO_2$. These very fine particles are positively charged in water, and enter between layers to neutralize negative charges. When a composite is prepared using synthetic resin and a sol of layered structure material hydrophobed by treatment with silane, the methoxy-, ethoxy- or silanol-radical of the silane has a condensation reaction with oxygen of the layered structure material, while the vinyl-, epoxy- or amino-radical of the silane is reacted with the synthetic resin. This accelerates the cross-linking reaction of the resin, thereby strengthening the bond between the layered structure material and synthetic resin and improving the adhesive strength.

In the reaction between the layered structure material and $\beta$-diketones (e.g., acetyl acetone) mixed with lauryl amine, $\beta$-diketone is easily introduced between the layers of the layered structure material due to the polarity of the amine, thus making a chelate bond between layers. For example, enol-form acetyl acetone is reacted with $Al^{3+}$ to form alminum acetyl acetonate, and lauryl amine is also co-ordinated between the layers, thereby substantially completely hydrophobing of the layered structure material due to combined working of the two compounds.

The "base-exchange reaction" takes place in a more intensive manner than the solvation reaction. The characteristic of this reaction is that ion-exchange of alkali ions between the layers is conducted simultaneously with the reaction.

If a solution of polar organic compound is added to a sol of untreated layered structure material having alkali ions co-ordinated between the layers, the polar organic compound is introduced between the layers to form a coordinate bond. That is, alkali ions such as $Ca^{2+}$, $Na^+$, $Li^+$ and the like are exchanged with the organic compound, and the coordinate bond is formed between the layers. Thus, ions between the layers and water between the layers are both replaced at the same time, and accordingly the base-exchange reaction is more efficient than the solvation reaction. Organic material used in the base-exchange reaction in accordance with this invention includes metal chelate-type titanium amide or zirconium amide and cationized silicone oil, which are hydrophobic.

Improved advantages of the sol of the layered structure material of this invention are as follows:

(a) A product prepared by using the sol of the layered structure material of this invention is not rehydrated.

Layered structure material used in this invention is swollen by hydration and is cleft into ultra-fine particles to form a stable sol. The ultra-fine particles of the hydrated layered structure material used in this invention exhibit various useful properties in that (1) they can be electrochemically cation-exchanged; (2) they can uniformly be dispersed in an organic vehicle; (3) they can be formed into a film-like product by drying; (4) they can be used to increase a viscosity of oil and fat material; (5) they can be adhesive; and (6) they can be used as a heat-resistant material. However, the ultra-fine particles of the layered structure material provides a dry product which forms a water layer between the lattice layers due to the bonding action of negative-charged oxygen on the surface of the particle with water molecules even after alkali ions between the layers are ion-exchanged with other cations. Since alkali ions are not present, the hydration of the product does not extend to cleavage but stops to the extent that a water layer is formed between the lattice layers. However, due to the water layer thus formed, the electric insulating properties of the product become remarkably poor. That is, due to dipolar action of the hydrogen bonded water molecule derived from a polar water molecule, the electric insulating properties deteriorate; the volume insulation resistance is $10^5 - 10^7$ ohm and the dielectric strength is less than 1,000 V/0.1 mm. These values do not reach the standard value of electric insulator, i.e. volume insulation resistance of higher than $10^{12}$ ohm and dielectric strength of higher than 1,200 V/0.1 mm.

According to the present invention, the water molecules between the layers which causes deterioration of the electrical insulating properties is replaced by an organic compound and the negative-charged oxygen is bonded with organic material. Consequently, since water molecules are not introduced, electric insulating properties are remarkably improved. That is, volume insulation resistance of a product prepared using the sol of the layered structure material of this invention is more than $10^{12}$ ohm and the dielectric strength is 3,000 V/0.1 mm. These values remain permanently constant. When hydrophobic silicone type organic material is used as a treating agent, a dry product provides water repellency.

(b) Heat-resistance of a product prepared by using the sol of the layered structure material of this invention is remarkably improved.

In the case of the conventional composite of inorganic material with organic material, heat-resistance is improved to some extent in proportion to the amount of inorganic material contained, but the organic material deteriorates at the inherent temperature limit of the organic material with respect to heat-resistance.

However, in the case of a composite of hydrophobed layered structure material with organic material (e.g., synthetic resin) prepared in accordance with this invention, the organic material present not only between the layers of the layered structure material but also between flake-like particles of the layered structure material make a coordinate bond, and consequently the temperature limit of deterioration of the organic material is highly raised thereby improving the heat-resistance of the composite.

For example, cationized silicone oil modified with a higher alcohol containing an amino radical usually deteriorates at about 180° C, but when it is introduced between layers of lithium hectorite by a "base-exchange reaction," it deteriorates at about 350° C. When acetyl acetone mixed with lauryl amine is used as a hydrophobing agent, and is introduced between layers of barium hectorite $Ba_{1/3}Mg_{2-2/3}Li_{1/3}(Si_4O_{10})F_2$ by "solvation reaction," it deteriorates at about 280° C although it inherently deteriorates at 140° C.

(c) Hydrophilic sol of layered structure material can be converted to hydrophobic sol having a lipophilic property by reacting it with organic material in accordance with this invention.

Organic material used in the hydrophobing treatment must be elected in view of its composition. For example, saturated hydrocarbons, unsaturated hydrocarbons and halides are useful to hydrophobe the surface of general particles, but they have no effect on removing water molecules between layers of layered structure material. Therefore, organic material used in the hydrophobing treatment in accordance with this invention has a composition which contains cationized amine or is used in combination with an amine compound. The organic material having the above composition is introduced between layers of layered structure material to react with the layered structure material.

When a solution of the above-mentioned organic material is added to a hydrated sol of layered structure material, the mixture forms a gel-like or flocculent cohered material although the form of cohered material varies slightly depending on the activity of the organic material and the viscosity of the layered structure material used. This gel-like cohered material is filtered by press or suction or is heated to remove water to such an extent that only a small amount of water remains in the cohered material. The cohered material is then washed with higher alcohol such as butanol or fractionated to remove the water in the presence of the organic solvent such as xylol having a higher boiling point than water. The washed cohered material is dispersed again in oily solution to form a stable suspension. The lipophilic sol thus obtained can be used to prepare a paint having excellent heat-resistance by mixing it with at least one of the solvent type synthetic resins such as epoxy, polyester, acryl, styrene, fluoroplastic, silicone and urethane resins and at least one of the water soluble type synthetic resins such as phenol, vinyl and melamine resins. The lipophilic sol of this invention can further be used as a thickening agent for oil and fat materials.

The heat-resistance of the paint prepared in this manner is much more excellent than that of conventional heat-resistant paint. For instance, conventional heat-resistance paint such as silicone type paint is flame-retardant but is gradually decomposed and peeled off upon contact with flame. However, a paint prepared by mixing the hydrophobed sol of this invention with solvent type resin (e.g., epoxy-modified silicone resin) or water soluble type resin (e.g., malamine resin) is not blistered nor peeled off upon contact with flame because flakes of the layered structure material are overlapped in parallel to form fire-resistant layers. Since the organic material is sealed by the flakes of the layered structure material, it is merely carbonized between the flakes. The carbonized material remains between the flakes of the layered structure material and is not burnt. As mentioned above, a paint prepared by using the sol of this invention provides excellent fire-resistant and heat-resistant properties.

(d) When a silane type compound coupling agent is used in "solvation type" hydrophobing reaction, it is very effective to strongly unite the layered structure material with synthetic resins such as epoxy, vinyl, acryl, polyester, melamine, urea, polyethylene, phenol, polypropylene resins and the like.

An amount of organic treating agent used to hydrophobe the layered structure material in accordance with this invention is generally 10 - 50% by weight, (on the basis of the total amount of layered structure material and organic treating agent), preferably 20 - 30% by weight. An amount of synthetic resin mixed with layered structure material is generally 20 - 80% by weight (on the basis of the total amount of layered structure material and resin) preferably 30 - 60% by weight.

This invention is further illustrated by the following Examples.

EXAMPLE 1

Sols of layered structure materials were prepared in the following manner:

Sol No. 1: 2% sol was prepared by dispersing synthetic tetra-silicic mica in water, the tetera-silicic mica having the formula, $KMg_{2-1/2}(Si_4O_{10})F_2$ wherein ions between layers were replaced by kalium.

Sol No. 2: 2% sol was prepared by dispersing synthetic hectorite in water, the hectorite having the formula, $K_{1/3}Mg_{2-2/3}Li_{1/3}(Si_4O_{10})F_2$ wherein ions between layers were replaced by kalium.

A treating agent used to hydrophobe the layered structure materials was 5% ethyl alcohol solution of aminoethyl modified silane coupling agent $(H_2N(CH_2)2NH(CH_2)3Si(OCH_3)_2CH_3)$.

300 cc of the ethyl alcohol solution of aminoethyl modified silane coupling agent was respectively mixed with 300 cc each of the above prepared Sol No. 1 and Sol No. 2 to carry out solvation reaction and to form jelly-like cohered material in the liquor.

The jelly-like material was filtered by a suction filter, and the filter cake was washed with 200 cc of butyl alcohol. The washed material was dried to obtain 95% solid material. The dried material was put in 50 cc of xylene, and was dipersed again by means of ultrasonic waves (28 KHz). To this dispersion, was added 20 g of epoxy resin (400 cps) diluted with xylene, and the mixture was coated on a substrate made of Teflon. The coated film was then dried at 30°–40° C for 10 hours, and was heated at 180° C for 2 hours to complete polymerization and curing. The film thus obtained had a size of 0.1 × 300 × 300 mm.

In order to substantiate the effect of hydrophobing treatment, similar films were prepared without conducting the hydrophobing treatment, and the films were compared with the films of the present invention with respect to physical and electrical properties. Thus, Sol No. 1 and Sol No. 2 were filtered respectively by a suction filter, and the filter cakes were fully washed with butyl alcohol. The washed material was dried at 120° C for 2 hours to obtain 98% solid material. The dried material was put in xylene to disperse once again after which, it was mixed with epoxy resin to obtain a film of 0.1 × 300 × 300 mm in the same manner as above.

The above prepared films of the present invention and the comparative films were allowed to stand in an atmosphere of RH 95% for 14 hours, and were checked with respect to moisture content absorbed and electric insulation.

The film of this invention prepared using Sol No. 1 had an absorbed moisture content of 0.2% and volume insulation resistance of $8 \times 10^{15}$ ohm. The film of this invention prepared using Sol No. 2 had an absorbed moisture content of 0.1% and volume insulation resistance of $5 \times 10^{15}$ ohm. The comparative film prepared using Sol No. 1 had an absorbed moisture content of 1.2% and volume insulation resistance of $5 \times 10^{10}$ ohm. The comparative film prepared using Sol No. 2 had an absorbed moisture content of 2.3% and volume insulation resistance of $7 \times 10^8$ ohm.

EXAMPLE 2

Sols of layered structure materials were prepared in the following manners:

Sol No. 3: 2% hydrated sol was prepared using synthetic sodium taeniolite having the formula, $NaMg_2Li(Si_4O_{10})F_2$.

Sol No. 4: 2% hydrated sol was prepared using synthetic lithium hectorite having the formula, $Li_{1/3}Mg_{2-2/3}Li_{1/3}(Si_4O_{10})F_2$.

The following silicone compound solution was prepared as a treating agent used to hydrophobe the layered structure materials. First, silicone oil was cationized by introducing amino radical in a methyl silicone molecule, and the cationized silicone oil was then dissolved in isopropyl alcohol. The cationized silicone oil solution was diluted with ethyl alcohol to prepare 5% solution.

200 cc of Sol No. 3 was mixed with 30 cc of the above prepared silicone oil solution by stirring, and 20 cc of Sol No. 4 was mixed with 40 cc of the same silicone oil solution by stirring. After stirring the respective mixtures for 20 minutes, cohered jelly-like materials were obtained. The respective cohered materials were then filtered by a suction filter, and the filter cakes were washed until no alkali ions were found in the washed solution. The washed material was further washed with 200 cc of isopropyl alcohol, and a solution containing the cohered material as a solid content in an amount of 7% was prepared by adding isopropyl alcohol. The cohered material was then dispersed again by means of ultrasonic waves (28 KHz) to prepare a uniform colloid.

The colloid solution was then cast in a mold made of polyethylene to produce a film of 3 × 200 × 200 mm. The film was dried in a drier at 40°–50° C for 4 hours, and then further dried at 120° C for 1 hour and 200° C for 2 hours to finally obtain a dry film having a thickness of 0.04 mm.

The above prepared two films were allowed to stand in an atmosphere of RH 90% for 10 hours, after which they were checked with respect to moisture content absorbed and electrical insulation. The absorbed moisture contents of the films were both within 0.3%, and dielectric strength of the films were both more than 4,000 V/0.1 mm, and volume insulation resistance of the films were both more than $10 \times 10^{14}$ ohm. These electric properties were maintained until 220° C.

EXAMPLE 3

The same sols as Sol No. 3 and Sol No. 4 used in Example 2 were used as a sol of layered structure material.

The following two kinds of organic material
(a) 2% ethyl alcohol solution of chelate type titanium amide and
(b) 2% ethyl alcohol solution of chelate type zirconium amide, were used as a treating agent. 300 cc of Sol No. 3 and Sol No. 4 were respectively mixed with 30 cc of the above treating agents (a) and (b). After stirring the mixture for 20 minutes, cohered material was obtained. The cohered material was filtered by a suction filter. The filter cake had a water content of 70%. The filter cake was then washed with distilled water until no alkali ions were found in the washed solution. The filter cake was further washed with 100 cc of butyl alcohol, and a solution containing the cohered material as a solid content in an amount of 10% was prepared by adding ethyl alcohol. The cohered material was then uniformly dispersed again by means of ultrasonic waves (28 KHz) in the same manner as above. The dispersion was then coated on a substrate made of polyethylene to prepare a film having a thickness of 3 mm. The coated film was dried in a drier at 30°–50° C for 5 hours, at 100°–120° C for 1 hour and at 200° C for 2 hours to prepare a dry film of 0.05 × 250 × 250 mm.

The films thus prepared were allowed to stand in an atmosphere of RH 90% for 24 hours, and were checked with respect to moisture content absorbed and electrical insulation. The results are as shown in following table.

| | Treating agent (a) | Treating agent (b) |
|---|---|---|
| (1) Water absorption (%) | | |
| Sol No. 3 | 0.1 | 0.2 |
| Sol No. 4 | 0.3 | 0.4 |
| (2) Volume insulation resistance (ohm) | | |
| Sol No. 3 | $8 \times 10^{14}$ | $7 \times 10^{14}$ |
| Sol No. 4 | $7 \times 10^{14}$ | $7 \times 10^{14}$ |
| (3) Dielectric strength (KV/0.1 mm) | | |
| Sol No. 3 | 4.5 | 4.5 |
| Sol No. 4 | 3.2 | 2.8 |

EXAMPLE 4

A sol of layered structure material was prepared in the following manner:

Sol No. 5: A hydrated sol containing aluminium taeniolite having the formula, $AlMg_2Li(Si_4O_{10})F_2$ in an amount of 13.7% (solid content) was prepared. The aluminium taeniolite is prepared by exchanging ions between layers of synthetic taeniolite with Al.

1,000 cc of Sol No. 5 was mixed with 400 cc of enol-type acetylacetone and then 500 cc of xylene solution containing lauryl amine $(C_{12}H_{25}NH_2)$ in an amount of 1%. After stirring the mixture with a glass rod for about 20 minutes, gel-like cohered material was obtained in the liquor. The gel-like cohered material was then filtered, and the filtered cohered material was squeezed using a filter cloth to remove water. The cohered material was then put into a fractional distillation apparatus, and xylol was added to the apparatus and heated to fractionate the water. When the temperature of the apparatus was raised more than 100° C, the cohered sol was taken out of the apparatus.

1 part of solid component of the cohered sol thus prepared was mixed with 5 parts of epoxy-modified silicone resin (epoxy resin 30%). The mixture was diluted with xylene to prepare a paint having a solid content of 20%. The paint was then coated on a degreased tin plate, and was dried at 50° C for 1 hour and further heated at 200° C for 1 hour to obtain a dry film having a thickness of 20 μ on the tin plate.

For the purpose of comparison, epoxy-modified silicone resin paint not containing the sol of this invention was coated on a degreased tin plate in the same manner as above, thereby obtaining a comparative film having a thickness of 20 μ on the tin plate.

The two plates were heated at 350° C, and the appearance of the films was checked. The film of the present invention showed no change even after heating for 30 minutes, while the comparative film was blistered and part of the film peeled off.

What we claim is:

1. A dispersion of ultra-fine particles of a layered structure material selected from the group consisting of montmorillonite, hectorite, tetra-silicic mica and taeniolite in an organic liquid, prepared by (a) cleaving the layered structure material into ultra-fine particles in an aqueous medium; (b) ion-exchanging hydratable ions of the ultra-fine particles with non-hydratable ions; (c) hydrophobing the ion-exchanged ultra-fine particles with an organic material selected from the group consisting of a titanic acid ester; a zirconic acid ester; silanes having one of methoxy-, ethoxy- and silanol-radicals and one of vinyl-, epoxy-, acryl- and amino-radicals; β-diketones mixed with lauryl amine; titanium amide; zirconium amide; and cationized silicone oil; (d) removing the aqueous medium; and (e) dispersing the hydrophobed particles in an organic liquid.

2. A dispersion of ultra-fine particles of layered structure material in an organic liquid according to claim 1, wherein the non-hydratable ion used in the ion-exchange step (b) is selected from the group of $K^+$, $NH_4^+$, $Pb^{2+}$, $Zn^{2+}$, $Sn^{2+}$, $Ba^{2+}$, $Sr^{2+}$, $Al^{3+}$, $Sb^{2+}$ and $Bi^{2+}$.

3. A dispersion of ultra-fine particles of a layered structure material in an organic liquid according to claim 1, in combination with a synthetic resin.

* * * * *